United States Patent
Giron et al.

(10) Patent No.: US 7,230,748 B2
(45) Date of Patent: Jun. 12, 2007

(54) ELECTROCHEMICAL DEVICE SUCH AS ELECTROCHROMIC OR PHOTOVOLTAIC DEVICE AND ELECTRICAL CONNECTION MEANS THEREOF

(75) Inventors: Jean-Christophe Giron, Aachen (DE); Fabien Beteille, Paris (FR); Xavier Fanton, Aulnay sous Bois (FR); Laurent Claude, Montrouge (FR); Samuel Dubrenat, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 779 days.

(21) Appl. No.: 10/312,556
(22) PCT Filed: Jul. 12, 2001
(86) PCT No.: PCT/FR01/02283

§ 371 (c)(1),
(2), (4) Date: Sep. 15, 2003

(87) PCT Pub. No.: WO02/06889

PCT Pub. Date: Jan. 24, 2002

(65) Prior Publication Data
US 2004/0053125 A1 Mar. 18, 2004

(30) Foreign Application Priority Data
Jul. 13, 2000 (FR) .................................. 00 09269

(51) Int. Cl.
G02B 1/15 (2006.01)
(52) U.S. Cl. ...................................... 359/265; 359/267
(58) Field of Classification Search ................ 356/265, 356/266, 267, 269, 271, 273, 274, 275
See application file for complete search history.

(56) References Cited

U.S. PATENT DOCUMENTS

| 4,874,229 | A | | 10/1989 | Ito et al. |
| 4,875,378 | A | * | 10/1989 | Yamazaki et al. ...... 73/862.046 |
| 4,902,108 | A | * | 2/1990 | Byker ........................ 359/265 |
| 5,202,787 | A | | 4/1993 | Barret et al. |
| 5,657,150 | A | * | 8/1997 | Kallman et al. ............ 359/275 |

(Continued)

FOREIGN PATENT DOCUMENTS

DE 198 02 339 7/1999

(Continued)

OTHER PUBLICATIONS

U.S. Appl. No. 10/312,556, filed Sep. 15, 2003, Giron, et al.

(Continued)

Primary Examiner—Timothy Thompson
(74) Attorney, Agent, or Firm—Oblon, Spivak, McClelland, Maier & Neustadt, P.C.

(57) ABSTRACT

An electrochemical device, especially an electrically controllable system with variable energy and/or optical properties or a photovoltaic device, including at least one substrate carrying an electroactive stack of layers arranged between a lower electrode and an upper electrode. Each electrode includes at least one electroconductive layer in electrical contact with at least one current lead. The current leads are arranged outside the region of the carrier substrate that is covered by the stack of electroactive layers.

51 Claims, 12 Drawing Sheets

U.S. PATENT DOCUMENTS

| | | | |
|---|---|---|---|
| 5,694,144 A * | 12/1997 | Lefrou et al. | 345/49 |
| 5,724,175 A | 3/1998 | Gordon et al. | |
| 6,248,263 B1 * | 6/2001 | Tonar et al. | 252/583 |
| 6,362,914 B2 * | 3/2002 | Baumann et al. | 359/265 |
| 6,594,065 B2 * | 7/2003 | Byker et al. | 359/265 |
| 2004/0053125 A1 | 3/2004 | Giron et al. | |

FOREIGN PATENT DOCUMENTS

| | | |
|---|---|---|
| EP | 0 532 942 | 3/1993 |
| FR | 2 781 084 | 1/2000 |
| JP | 59 219968 | 12/1984 |

OTHER PUBLICATIONS

U.S. Appl. No. 10/773,170, filed Feb. 9, 2004, Giron.
U.S. Appl. No. 10/312,556, filed Sep. 15, 2003, Giron et al.
U.S. Appl. No. 10/495,758, filed May 27, 2004, Beteille et al.
U.S. Appl. No. 10/512,861, filed Nov. 15, 2004, Beteille, et al.
U.S. Appl. No. 11/064,095, filed Feb. 24, 2005, Fanton, et al.
U.S. Appl. No. 10/530,062, filed Apr. 4, 2005, Beteille, et al.
U.S. Appl. No. 10/563,322, filed Jan. 4, 2006, Giron, et al.
U.S. Appl. No. 10/564,501, filed Jan. 13, 2006, Giron, et al.

* cited by examiner

FIG-1

ELECTROCHEMICAL DEVICE SUCH AS ELECTROCHROMIC OR PHOTOVOLTAIC DEVICE AND ELECTRICAL CONNECTION MEANS THEREOF

BACKGROUND OF THE INVENTION

1. Field of the Invention

The subject of the present invention is an electrochemical device, especially an electrically controllable system of the glazing type and with variable energy and/or optical properties or a photovoltaic device.

2. Discussion of the Background

At the present time, there is an increased demand for glazing called "intelligent" glazing capable of being adapted to the needs of the users.

There is also an increased demand for photovoltaic glazing, which makes it possible to convert solar energy into electrical energy.

With regard to "intelligent" glazing, this may involve controlling the amount of sun passing through glazing mounted externally in buildings or vehicles of the automobile, train or aircraft type. The aim is to enable excessive heating inside passenger compartments or premises to be limited, but only in the case of strong sunshine.

It may also involve controlling the degree of vision through glazing, especially so as to cloud them, make them diffusing or even to prevent any vision when that is desirable. This may relate to glazing mounted as interior partitions in premises, trains, aircraft or mounted in the side walls of an automobile. This also relates to mirrors used as rear-view mirrors, in order to promptly prevent the driver getting dazzled, or signaling panels, in order that messages appear when this is necessary, or intermittently in order to attract attention better. Glazing which can be made diffusing at will can be used when desired as projection screens.

There are various electrically controllable systems which make this sort of modification in appearance or thermal properties possible.

To modify the light transmission or the light absorption of the glazing, there are systems called viologen systems, such as those described in patents U.S. Pat. No. 5,239,406 and EP-612 826.

To modify the light transmission and/or the thermal transmission of the glazing, there are also systems called electrochromic systems. These generally comprise, in a known manner, two layers of electrochromic material separated by an electrolyte layer and surrounded by two electroconductive layers. Each of these layers of electrochromic material may reversibly insert cations and electrons, the alteration of their oxidation state following these insertions/deinsertions leading to an alteration in their optical and/or thermal properties.

It is common practice to put the electrochromic systems into three categories:

that where the electrolyte is in the form of a polymer or a gel; for example, a proton conductive polymer such as those described in patents EP-253 713 or EP-670 346 or a lithium-ion-conducting polymer such as those described in patents EP-382 623, EP-518 754 and EP-532 408, the other layers of the system generally being mineral in nature, that where the electrolyte is mainly a mineral layer. This category is often called an "all-solid" system, examples thereof can be found in the patents EP-867 752, EP-831 360, the patent FR-99/03420 filed on Mar. 19, 1999 corresponding to patent PCT/FR00/00675 filed on Mar. 17, 2000, the patent FR-2 781 084 corresponding to the patent of filing number WO/FR99/01653, filed on Jul. 8, 1999, that where all the layers are polymer-based, a category which is often called an "all-polymer" system.

There are also systems called "light valve" systems. These involve films comprising a polymer matrix which is generally crosslinked, in which microdroplets, containing particles which are capable of placing themselves in a favored direction under the action of a magnetic or electric field, are dispersed. A light valve comprising a polyorganosilane matrix and particles of the polyiodide type, which intercept much less light when a voltage is applied to the film, is also known from patent WO93/09460.

Systems called liquid crystal systems may also be mentioned, with a mode of operation similar to the above. They are based on the use of a polymer-based film placed between two conductive layers, in which droplets of liquid crystals, in particular nematic liquid crystals with positive dielectric anisotropy, are arranged. When a voltage is applied to the film, the liquid crystals orient themselves along a favored axis, which enables vision. Without the voltage, in the absence of crystal alignment, the film becomes diffusing and prevents vision. Examples of such films are described, in particular, in European patent EP-0 238 164, and American patents U.S. Pat. No. 4,435,047, U.S. Pat. No. 4,806,922, U.S. Pat. No. 4,732,456. This type of film, once interposed and incorporated between two glass substrates, is marketed by Saint-Gobain Glass under the commercial name "Priva-Lite".

In fact it is possible to use all the liquid crystal devices known under the names of "NCAP" (Nematic Curvilinear Aligned Phase) or "PDLC" (Polymer Dispersed Liquid Crystal).

It is also possible to use, for example, cholesteric liquid crystal polymers, such as those described in patent WO92/19695.

All these systems have in common the need to be equipped with current leads to supply electrodes generally in the form of two electroconductive layers on each side of the layer or various active layer(s) of the system.

These current leads are often in the form of metal clips placed above and below the glazing region provided with the active layer or layers. They are perceived as unesthetic, hence the need to hide them by various means. This masking of the periphery of electrically controllable systems complicates their manufacture and moreover reduces the "active" area of the glazing that can be exploited by the user.

SUMMARY OF THE INVENTION

The aim of the invention is therefore to provide an improved connection for the electrically controllable systems of the glazing type which have been mentioned above. In particular, it has the aim of providing a connection which is better from a visual and/or electrical point of view and which, preferably, remains simple and flexible to implement on the industrial scale. It relates to all the systems listed above, and more specifically to the electrochromic glazing called "all-solid" glazing.

The subject of the invention is firstly an electrochemical device of the type described above, which comprises at least one substrate carrying an electroactive stack of layers arranged between an electrode called a "lower" electrode and an electrode called an "upper" electrode, each comprising at least one electroconductive layer. Each of the electrodes is in electrical contact with at least one current lead.

According to the invention, these current leads are arranged outside the region of the carrier substrate which is covered by the stack of electroactive layers.

In the sense of the invention, the term "lower" electrode refers to the electrode which is closest to the carrier substrate taken as a reference, on which at least part of the active layers (all the active layers in an "all-solid" electrochromic system) is arranged. The "upper" electrode is the one placed on the other side, with respect to the same reference substrate.

The invention is applicable to glazing in the broadest sense: the carrier substrate is generally rigid and transparent, of the glass or polymer type such as polycarbonate or polymethylmethacrylate (PPMA). However, the invention includes polymer-based substrates which are flexible or semiflexible.

Generally, the electrodes are transparent. However, one of them may be opaque if the glazing operates not in transmission but in reflection (mirror).

The active system and the upper electrode are generally protected by another substrate of the rigid type, possibly a laminate including one or more thermoplastic polymer films of the EVA (ethylene vinyl acetate), PVB (polyvinyl butyral) or PU (polyurethane) type.

The invention also includes protection of the system by a flexible or semiflexible substrate, in particular a polymer-based substrate.

It is also possible to avoid a lamination operation carried out in the hot state, possibly under pressure, by substituting the conventional thermoplastic interposed film with a double-sided adhesive film, whether supported or not, which is commercially available and which has the advantage of being very thin.

In the sense of the invention, and for the sake of concision, the term "active stack" or "electroactive stack" denotes the active layer or layers of the system, that is to say all the layers of the system except for the layers belonging to the electrodes. For an electrochromic system, it therefore mainly consists of a layer of an anodic electrochromic material, an electrolyte layer and a layer of a cathodic electrochromic material, it being possible for each of these layers to consist of a monolayer or a plurality of concurrent superimposed layers having the same function.

Generally, each electrode contains one electroconductive layer or several superimposed electroconductive layers, which will be considered henceforth as a single layer. Generally, two current leads, placed along the two opposed edges of the layer when it has the outline of a rectangle, a square or a similar geometric shape of the parallelogram type, are needed in order to supply the electroconductive layer correctly.

Commonly, these leads are in the form of clips, that is to say opaque metal strips which are generally copper-based and often silvered. The clips, especially with regard to the "upper" electrode, are placed on its face opposite to that in contact with the active stack. Since the stack and the electroconductive layer in question have generally the same dimensions, this means that 1 or 2 cm of the assembly must be hidden once the system is completed, in order to hide the region of the glazing provided with clips. According to the invention, the procedure is different since these current leads are taken away from the active stack. Even if this masking remains necessary, it will not hide a large portion of the "active" area of the glazing.

In the invention, the dimensions of the active stack are almost the dimensions of the electrically controllable area accessible to the user, and there is no or little loss of active area, in any case much less than the loss of area caused by the usual placement of clips on the active stack.

Apart from this considerable advantage, the invention has another benefit, namely it is guaranteed that the placement of the clips will not risk damaging the active stack. There is no local overthickness in the glazing due to the presence of clips in the main region where the active layers of the system are present. Finally, moving the electrical supply of these leads away from the sensitive part of the system may be facilitated, as well as their placement itself.

The present patent application sets out firstly to describe a preferred embodiment of the "lower" electrode of the system.

Advantageously, the lower electrode may comprise an electroconductive layer which covers at least one region of the carrier substrate not covered by the active stack. Moreover, the benefit of this configuration is that it is easy to obtain: it is possible to deposit the conductive layer, for example, over the entire surface of the substrate. This is in fact the case when the electroconductive layer is placed on the glass on the glass manufacturing line itself, in particular by pyrolysis on the ribbon of float glass. The rest of the layers of the system may then be deposited on the glass once it is cut to the desired dimensions, with a temporary masking system.

The other benefit is that these regions of the substrate which are only covered by the lower electroconductive layer will be able to serve for the placement of current leads "offset" according to the invention.

An example of an electroconductive layer is a layer based on a doped metal oxide, in particular indium oxide doped with tin, called ITO, or tin oxide doped with fluorine $SnO_2$:F, possibly deposited on a prelayer of the silicon oxide, oxycarbide or oxynitride type, with an optical function and/or a barrier function against alkalines when the substrate is made of glass.

Accordingly to a variant, the electroconductive layer of the lower electrode covers a region $Z_1$ of the carrier substrate which completely covers the region $Z_2$ which is covered by the active stack, the region $Z_1$ having dimensions greater than the region $Z_2$. In this way, it is possible to have two regions $Z_1$ and $Z_2$ essentially of rectangular shape, with the region $Z_1$ greater than $Z_2$ and approximately centered on the latter.

Alternatively, it is possible to have both regions $Z_1$ and $Z_2$ essentially rectangular, the two regions partially covering each other. This then gives a scenario where there are regions of the substrate which are covered by the electroconductive layer and not by the active stack, and vice versa.

It is also possible to have the rectangular region $Z_1$ exceeding, on two of its opposed sides only, the region $Z_2$.

The region $Z_3$ covered by the electroconductive layer of the upper electrode is itself preferably essentially identical to the region $Z_2$ covered by the active stack. Its configuration will be detailed below. The benefit of this characteristic is the simplicity of its manufacture, especially when dealing with an "all-solid" electrochromic system where all the layers involved are deposited one after the other on a single carrier substrate. The layer thus has the same dimensions and the same configuration as the underlying active layers of the active system. It may therefore be deposited after the latter, for example on a line for depositing the layers under vacuum of the sputtering type.

We now come to the configuration of the "lower" electrode. It has been seen that the lower electroconductive layer has regions not covered by the active stack. Some will serve for the ad hoc placement of current leads. It is also necessary to avoid any short circuit between the "bare" conductive regions and the current leads of the upper electrode. With this objective, provision is therefore advantageously made, according to a variant, to "deactivate" this lower electroconductive layer over at least part of its periphery corresponding at least in part to a bare region, not covered by the active stack. The term "deactivated" refers to a portion of electroconductive layer which no longer fulfills its basic function, and which no longer participates in the electrical conduction of the rest of the layer from which it is electrically insulated.

Preferably, these "deactivated" regions overlap a region covered by the active stack and a region not covered by the active stack.

This deactivation will be detailed with the help of examples. In particular, it may involve making an incision in the layer or a localized heat treatment, as is described, for example, in the aforementioned patent WO/FR/99/01653.

According to one embodiment of this variant, the lower electroconductive layer covers a substantially rectangular region $Z_1$ of the substrate, with two deactivated regions along the two opposed edges of said rectangular region (it being possible for these regions then to be left in contact with the upper electrode leads, since they are electrically insulated, while it is possible to have two other regions, on the edges of the two other opposed edges, which are left bare and electrically active for connection with the current leads of the lower electrode).

According to another embodiment, the lower electroconductive electrode comprises, over its entire periphery, a deactivated region (on two of its opposed edges for the reasons stated above, that is to say to avoid short circuits with the current leads of the upper electrode. On the two other edges, regions are nevertheless left active and bare for connection with the current leads of the lower electrode, the deactivated regions only being able to affect the extreme periphery of the layer on these two edges).

Whatever the embodiment of the localized deactivation of the lower electroconductive layer, it can be carried out, as stated above, by carrying out an incision of the layer along one or more lines. It may involve a line closed around its entire periphery (deactivation over its entire outline). The incision may also be carried out along two lines crossing the layer from one side to the other (deactivation over two of its opposed edges), or along two lines closed along two of its opposed edges (delimitation of two deactivated regions, by leaving the extreme perimeter of the layer electrically active).

The incision of the electroconductive layer may be carried out before depositing the other layers and therefore involves only that layer. The incision may also be carried out after depositing the layers of the active system and even after depositing the upper conductive layer. In this case, when the incision line is partly under the active layers and possibly under the upper conductive layer, all the layers are incised at this location. It should be noted that, in order to deactivate the layer locally, it is possible to carry out a localized ablation operation rather than incising it, especially before depositing the other layers, or to deposit it with the necessary masks.

The present patent application now sets out to describe various configurations for the active stack.

Independently of the possible incision of the lower conductive layer which may simultaneously involve that of the active system, the invention advantageously provides for deactivating the active stack over at least part of its periphery. In this case, the term "deactivated" has a sense similar to that of the previous conductive layer. It means that the stack does not operate in this region, and that it remains passively in a given state, whatever the electrical supply. This deactivation is as marginal as possible, in order to keep the active area as large as possible.

According to one embodiment, the electroactive stack covers a substantially rectangular region $Z_2$ of the carrier substrate, with two peripheral regions deactivated in this way, along two of its opposed edges. Alternatively, the stack comprises a deactivated region over its entire periphery.

These regions may be deactivated in a way similar to the deactivated regions of the lower electroconductive layer described above, by incision of the whole stack, along two lines crossing it from one side to the other on two of its edges or along a line closed around its periphery. (In this way, a proper ablation of the stack could thus be carried out in these regions.) These incisions could be carried out after depositing the electroconductive layer of the upper electrode, while also incising/deactivating it simultaneously. Preferably, the underlying lower electrode is not incised simultaneously.

This deactivation is therefore superimposed with the previous: in the case of the lower conductive layer, its local deactivation would affect at least one region not covered by the active stack (two opposed edges/its entire periphery).

In the case of the active stack, it generally does not affect the lower conductive layer, and may be made on the two other opposed edges or the periphery of the stack.

This deactivation of the active stack combines with the previous deactivation in order to avoid any risk of short circuits between the two "lower" and "upper" conductive layers, and has been described in some of its embodiments in the aforementioned patent WO/FR99/01653, whose teaching is incorporated in the present application.

For further details on the nature of the layers of the active stack, reference may be made to the aforementioned patents. In the case of "all-solid" electrochromic systems, the preferred application of the invention, the active stack comprises the superposition of layers which are mainly mineral and which can be deposited successively by sputtering.

The protonic cathodic electrochromic material is preferably tungsten oxide which is possibly hydrated or hydroxylated. The protonic anodic electrochromic material is preferably iridium oxide or nickel oxide which is possibly hydrated or hydroxylated. The electrolyte, according to patent EP-867 752, is preferably a superposition of several layers, comprising for example a layer of protonic cathodic electrochromic material of the tungsten oxide type combined with at least one other layer, in order to inhibit its electrochromic properties and so that it only plays the role of a vector.

The present patent application now sets out to describe the preferred configurations of the "upper" electrode.

Advantageously, at least one of the two electrodes, and most particularly the upper electrode, comprises an electroconductive layer combined with a network of conductive wires or of electrically conductive strips.

As has been seen above, the upper conductive layer generally has the same dimensions as the active stack and is deposited on the same deposition line (sputtering). It generally involves layers of doped oxide of the ITO or ZnO type doped, for example, with Al, Ga, etc. or a layer of metal of the silver type possibly combined with one or more protective layers which are themselves also conductive (Ni, Cr, NiCr, etc.), and with one or more protective layers and/or with an optical role, made of a dielectric (metal oxide, $Si_3N_4$). In this scenario, the question was to know how to "offset" these current leads outward. It has already been described in the aforementioned application PCT/FR00/00675 how to combine the conductive layer with a material which is more conductive than it, for example wires made of metal of the copper type, in order to significantly increase its conductivity. The aim was to have, for electrochromic glazing, a system which has a faster switching time, and which attenuates the coloration front phenomenon, where the system colors or decolors uniformly over its entire active surface, without any longer having the color modification propagating from its periphery.

The present invention, by using this type of additional conductive network, keeps these considerable advantages. But it will also exploit another possibility offered by its presence, namely, by these wires or these strips, it will be able to offset the current leads away from the surface covered by the upper conductive layer, by putting them in electrical contact, not with this layer, but with the ends of these wires or strips, configured so as to "exceed" the surface of the conductive layer.

In its preferred embodiment, the conductive network comprises a plurality of metal wires placed on the surface of a polymer film of the thermoplastic type. It is possible to affix this film to the wires embedded in its surface on the upper conductive layer in order to ensure their physical contact/their electrical contact. The thermoplastic film may act to laminate the first carrier substrate of the glass type with another pane of glass.

Advantageously, the wires/strips are placed essentially parallel to each other (they may be straight or corrugated), preferably in an orientation which is essentially parallel to the length or to the width of the upper conductive layer. The ends of these wires exceed the region of the substrate covered by the upper conductive layer on two of its opposed sides, in particular by at least 0.5 mm, for example by 3 to 10 mm. They may be made of copper, tungsten, graphitized tungsten, or even an iron-based alloy of the nickel-iron type.

It is expedient to prevent the ends of these wires from being in electrical contact with the lower conductive layer. It is therefore preferred that the ends which exceed the upper conductive layer are only in contact with the lower conductive layer in the deactivated regions thereof.

Alternatively or cumulatively, in order to avoid any short circuits with the lower conductive layer, the ends of the wires may be electrically insulated from the latter (where they are capable of being in contact with its active region) by the insertion of strip(s) of insulating material, for example polymer-based material.

It should be noted that it is possible, alternatively or cumulatively, to use the same type of conductive network for the electrode called the "lower" electrode.

The present patent application now sets out to describe various types of current leads and their arrangements in the system.

With regard to the upper electrode, according to a variant, the ends of the wires/strips of the conductive network mentioned above may be electrically connected to two current leads in the form of flexible strips made of an insulating polymer covered on one of their faces with conductive coatings. This type of lead is sometimes called a "P.F.C." (Flexible Printed Circuit) or a "F.L.C." (Flat Laminated Cable) and is already used in various electrical/electronic systems. Its flexibility, the various configurations that can be obtained, the fact that the current lead is electrically insulated on one of its faces, makes its use very attractive in the present case.

According to another variant, the ends of these wires are in electrical contact with two deactivated regions of the lower conductive layer, and these two deactivated regions are in electrical contact with the current leads intended for the upper electrode. Conductive "clips" may conveniently be used, which clip onto the carrier substrate in the aforementioned regions. It is an original solution to use the lower electrode to provide the electrical connection with the upper electrode.

With regard to the current leads of the lower electrode, it is possible to connect it electrically along two of its opposed edges in active regions which are not covered by the active stack. These leads may be the clips mentioned above.

It is also possible to bring together the current leads of the lower and upper electrodes in the form of flexible strips, as mentioned above. Thus it may involve two substantially identical strips, each one having a flexible support made of an electrically insulating polymer approximately in the shape of an L (of course, many other configurations could be envisioned for the geometric shape of the carrier substrate and of the layers with which it is provided). On one of the sides of this L, there is a conductive coating on one face. On the other side of the L, there is a conductive coating on the face opposite to the previous face. This overall system of current leads also consists of two of these "Ls" on a plastic support. In combination, they provide two conductive strips on one face for one of the electrodes and two conductive strips on their opposed face for the other electrode. It is a compact system which is easy to place. Close to the junction between the two edges of each L, there is a socket electrically connected to the conductive coatings of the leads.

It is also possible to go further with compactness, by replacing these two "Ls" with a complete frame: in this case a strip of insulating polymer of approximately rectangular shape, with, on two of its opposed edges, a conductive coating on one face, and similarly on its two other opposed edges on the other face. Preferably, there is then just a single external socket instead of two. The frame may be in one piece, or in several parts which are assembled during mounting.

The current leads of the lower and/or upper electrodes may also be in the form of conventional clips, for example in the form of metal strips of the copper type which are possibly silvered.

The current leads of the lower and/or upper electrodes may also be in the form of a conductive wire (or several assembled conductive wires). These wires may be made of copper, tungsten or graphitized tungsten and may be similar to those used to constitute the conductive network mentioned above. They may have a diameter of from 10 to 600 μm. This type of wire is in fact enough to electrically supply the electrodes in a satisfactory manner, and are remarkably discreet. It may become pointless to mask them on mounting the device.

The configuration of the current leads is very adaptable. Substantially rectangular active systems have been described in more detail above, but they may take a large number of different geometrical shapes, in particular by following the geometrical shape of their carrier substrate, namely a circle, square, half circle, oval, any polygon, diamond, trapezium, square, any parallelogram etc., and in these various scenarios, the current leads are no longer necessary for each electrode to supply current lead "pairs" facing each other. Thus it may involve, for example, current leads which completely surround the conductive layer (or at the very least, which follow a good part of its periphery). This is quite achievable when the current lead is a single conductive wire. It may also involve point-like current leads, especially when the device is small in size.

The device according to the invention may use one or more substrates made of bulk tinted glass. Advantageously, if it involves laminated glazing, the bulk tinted glass is the glass intended to be turned inward in the premises or in the inner compartment, the outer glass being clear. The tinted glass makes it possible to adjust the level of light transmission of the glazing. Placed on the inside, its heating is limited by absorption. The glass may also be curved, as is the case for applications such as an electrochromic automobile roof, in particular.

The glazing according to the invention may comprise additional functionalities: it may for example comprise an infrared reflecting coating, as is described in patent EP-825 478. It may also comprise a hydrophilic, antireflection, hydrophobic coating, a photocatalytic coating with antifouling properties comprising titanium oxide in anatase form, as is described in patent WO 00/03290.

BRIEF DESCRIPTION OF THE DRAWINGS

The invention will be detailed below with nonlimiting exemplary embodiments, using the following figures:

FIGS. 1 to 12: representations in top view of an "all-solid" electrochromic glazing.

DESCRIPTION OF THE PREFERRED EMBODIMENTS

Figure 2:
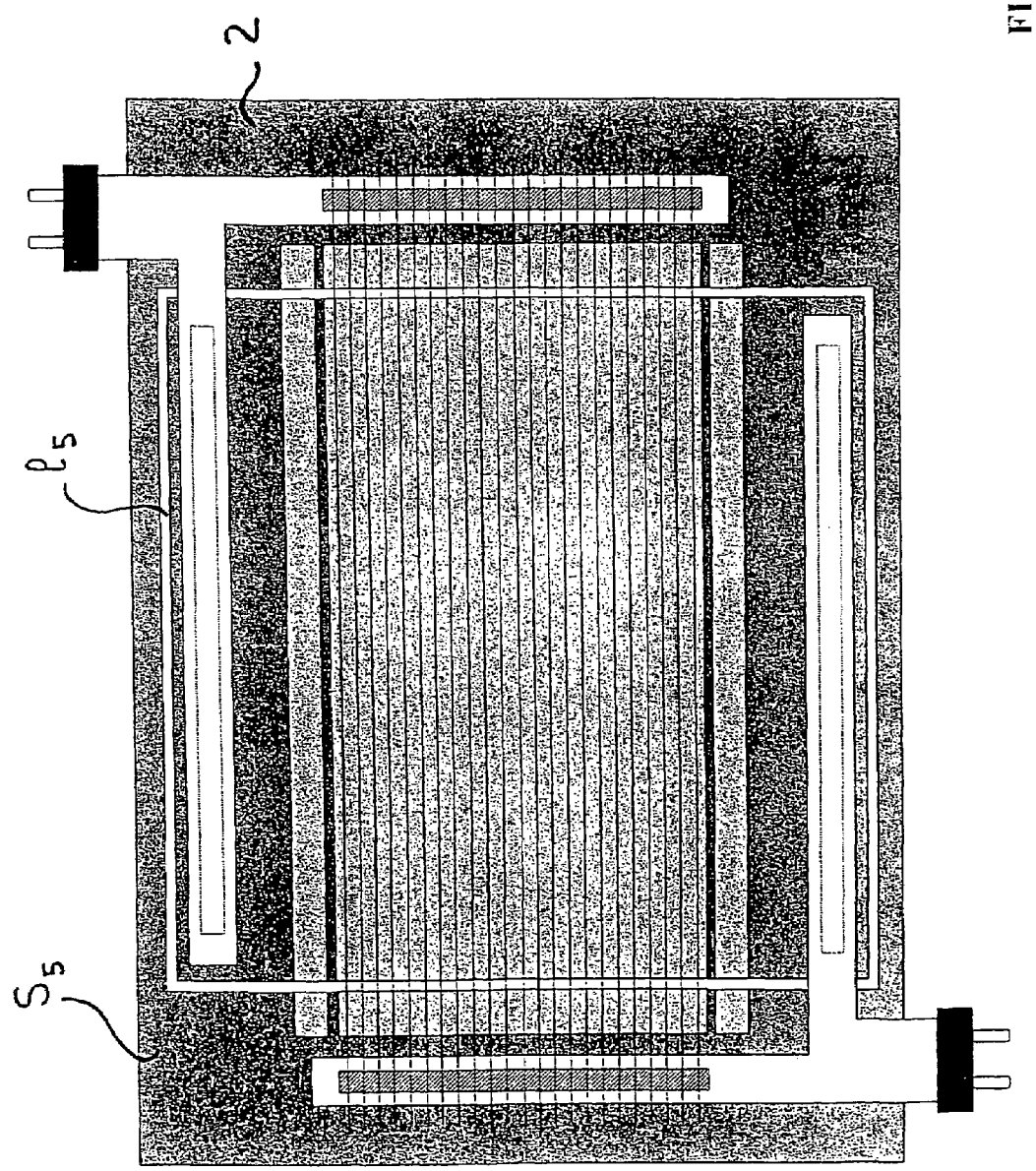

All the figures are schematic in order to facilitate their reading, and are not necessarily to scale for the various elements that they show.

All the figures relate to an "all-solid" electrochromic glazing, in a laminated structure with two panes of glass, in a configuration adapted, for example, to use as glazing for an automobile roof.

All the figures show a glass pane 1, provided with a lower conductive layer 2, an active stack 3, surmounted by an upper conductive layer, a network of conductive wires 4 above the upper conductive layer and embedded in the surface of an ethylene vinyl acetate EVA (or polyurethane) film which is not shown for increased clarity. The glazing also comprises a second glass pane, not shown for further clarity, above the EVA film 5. The two glass panes and the EVA film are secured by a known lamination or calendering technique, by heating, possibly under pressure.

The lower conductive layer 2 is a bilayer consisting of a first 50 nm SiOC layer surmounted by a second 400 nm $SnO_2$:F layer (the two layers preferably deposited successively by CVD on the float glass before cutting).

Alternatively, it may involve a bilayer consisting of a first layer based on $SiO_2$ doped with a small amount of metal of the Al type of about 20 nm thick surmounted by a second layer of ITO of about 150 to 350 nm thick (the two layers preferably deposited successively, under vacuum, by sputtering assisted by a magnetic field and reactive in the presence of oxygen, possibly in the hot state).

The active stack 3 is decomposed as follows:
a first layer of anodic electrochromic material made of (hydrated) iridium oxide $IrO_xH_y$, from 40 to 100 nm thick, (it may be replaced by a layer made of hydrated nickel oxide),
a layer made of 100 nm tungsten oxide,
a second layer made of 100 nm hydrated tantalum oxide,
a second layer of cathodic electrochromic material based on 370 nm tungsten oxide $H_xWO_3$.

All these layers are deposited in a known manner by reactive sputtering assisted by a magnetic field.

The upper conductive layer is a layer of ITO from 100 to 300 nm thick, also deposited by reactive sputtering assisted by a magnetic field.

The conductive wires 4 are mutually parallel straight wires made of copper, deposited on the EVA film 5 by a technique known in the field of windshields having heated wires, for example described in patents EP-785 700, EP-553 025, EP-506 521, EP-496 669. Schematically, it involves using a heated pressing roller which presses the wire into the surface of the polymer film, the pressing roller fed with wire from a feed reel using a wire guide device.

The EVA film 5 has a thickness of about 0.8 mm.

The two glass panes are made of standard silica-sodalime clear glass each about 2 mm in thickness.

EXAMPLE 1

Figure 1:
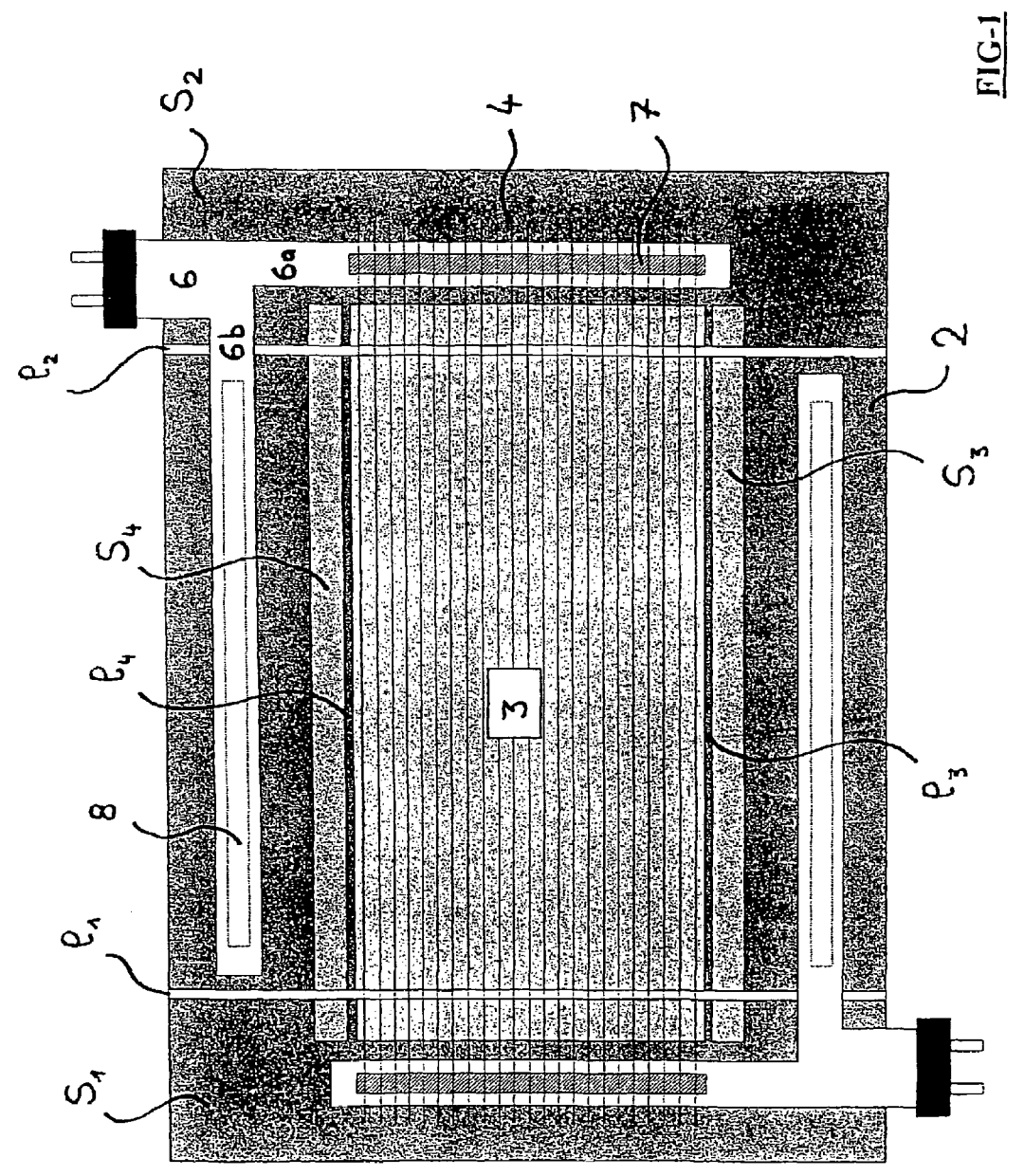

This is the configuration shown in FIG. 1:
The lower conductive layer 2 covers the whole area of the glass pane. Its margins are set along two incision lines $l_1$, $l_2$ on its two smallest opposed sides (layer with overall rectangular shape), by means of a laser. The incision lines also affect the active system and the upper electrode since they are made after depositing all the layers. These two lines therefore delimit two regions $s_1$ and $s_2$ which are deactivated for the whole electrochromic system, including the two electrodes.

The margins of the active system and the upper conductive layer 3 are also set along two other incision lines $l_3$, $l_4$, after depositing all the layers. These incisions do not affect the lower conductive layer, and are made on the longest edges of the system and of the upper conductive layer. The active system and the upper conductive layer also cover a rectangular region of the substrate, with dimensions less than those covered by the lower conductive layer. These two rectangular regions are centered one with respect to the other. The incision lines $l_1$, $l_2$ on the one hand and $l_3$, $l_4$ on the other hand are therefore mutually perpendicular. The incisions $l_3$, $l_4$ delimit two deactivated regions $s_3$, $s_4$ of the active system 3, therefore two other passive regions of the electrochromic glazing in its entirety.

The current leads 6 are symmetrical with each other: they involve two strips 6a, 6b of an approximately L-shape, made of an insulating polymer. On the shortest side of the two Ls, there is a conductive coating 7 turned toward the wires 4. On the longest side of the two Ls, there is a conductive coating 8, shown in dotted line since it is on the other face, on the face turned toward the lower conductive layer 2.

The conductive coatings 7 are in electrical contact with the wires 4, and therefore provide, via these wires 4, the electrical supply to the upper electrode. The end of these wires, outside the surface covered by the stack 3, is only in contact with the insulating polymer support of the leads 8 or with the deactivated regions $s_1$, $s_2$ of the lower electrode: in this way, any risk of short circuits between these wires and the lower electrode is avoided.

The conductive coatings 8 are in contact with the regions of the lower conductive layer 2 which are active and not covered by the stack 3: they make it possible to power the lower conductive layer 2. For each of these current leads, there is a socket 12 placed approximately in the angle of the L of the current lead, with electrical connections suitable for each of the conductive coatings 7 and 8.

EXAMPLE 2

This is the configuration shown in FIG. 2 which is quite similar to that of example 1.

The difference with example 1 resides in the way in which the margins of the lower conductive layer 2 are set: in example 2, the incision is carried out along a closed line $l_5$, which delimits an inactive region $s_5$ over the entire periphery of the lower conductive layer, and over two opposed edges of the active system (as in the previous case).

EXAMPLE 3

Figure 3:
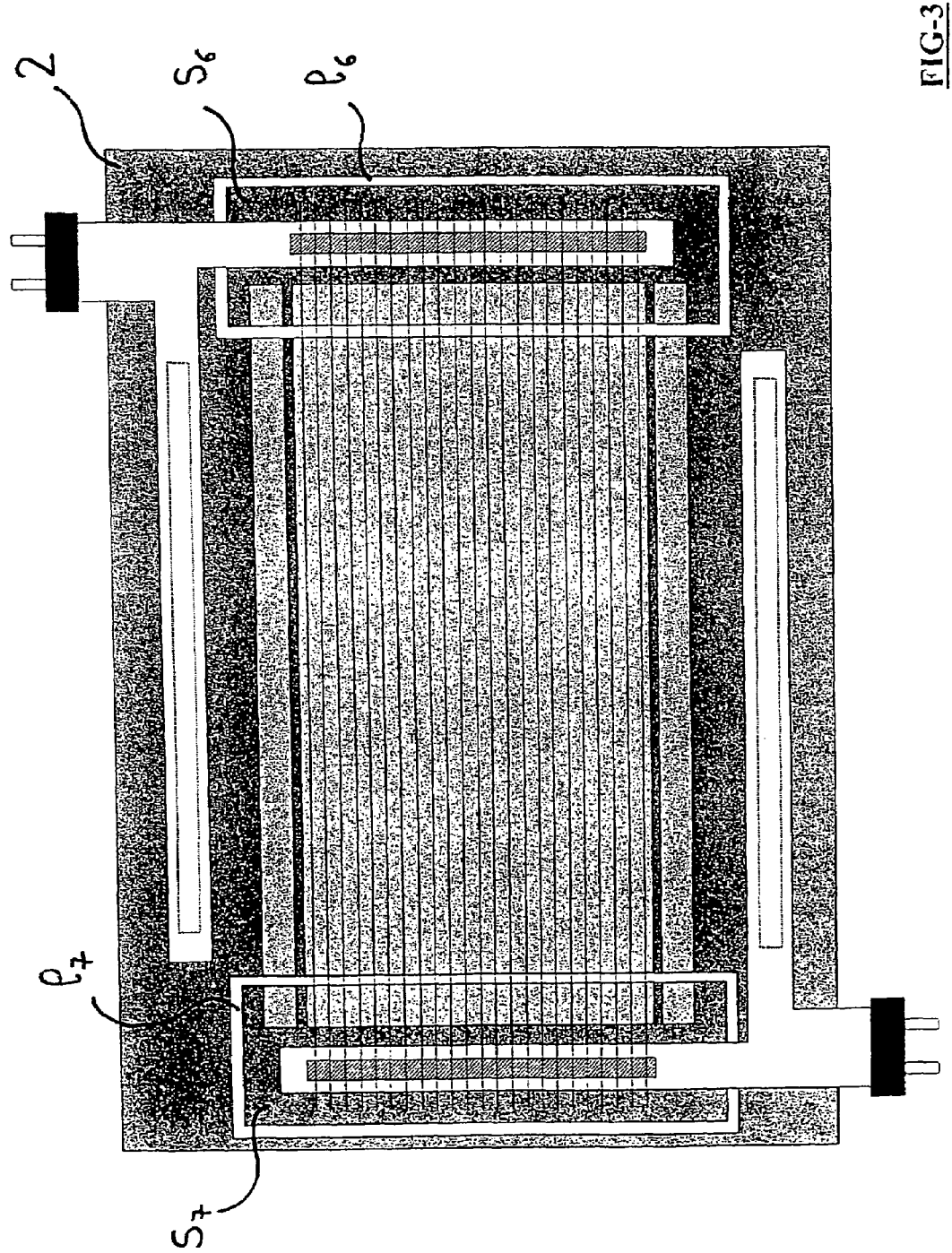

This is the configuration shown in FIG. 3 and which is a variant of the two preceding figures. This time, the margins of the lower conductive layer 2 are set along two closed lines $l_6$, $l_7$ which have a substantially rectangular outline, partly on the region covered by the conductive layer 2, partly on the region also covered by the active stack 3. As in Example 1, there are also two deactivated regions $s_6$, $s_7$ on the two opposed edges of the layer 2, delimited by the two lines $l_6$ and $l_7$, and which therefore do not go up to the extreme perimeter of the layer.

These three examples therefore have in common that they deactivate the electrochromic glazing on two of its opposed edges, in regions overlapping the region covered only by the lower conductive layer, and the region covered both by this layer and by the active stack 3.

EXAMPLE 4

Figure 4:
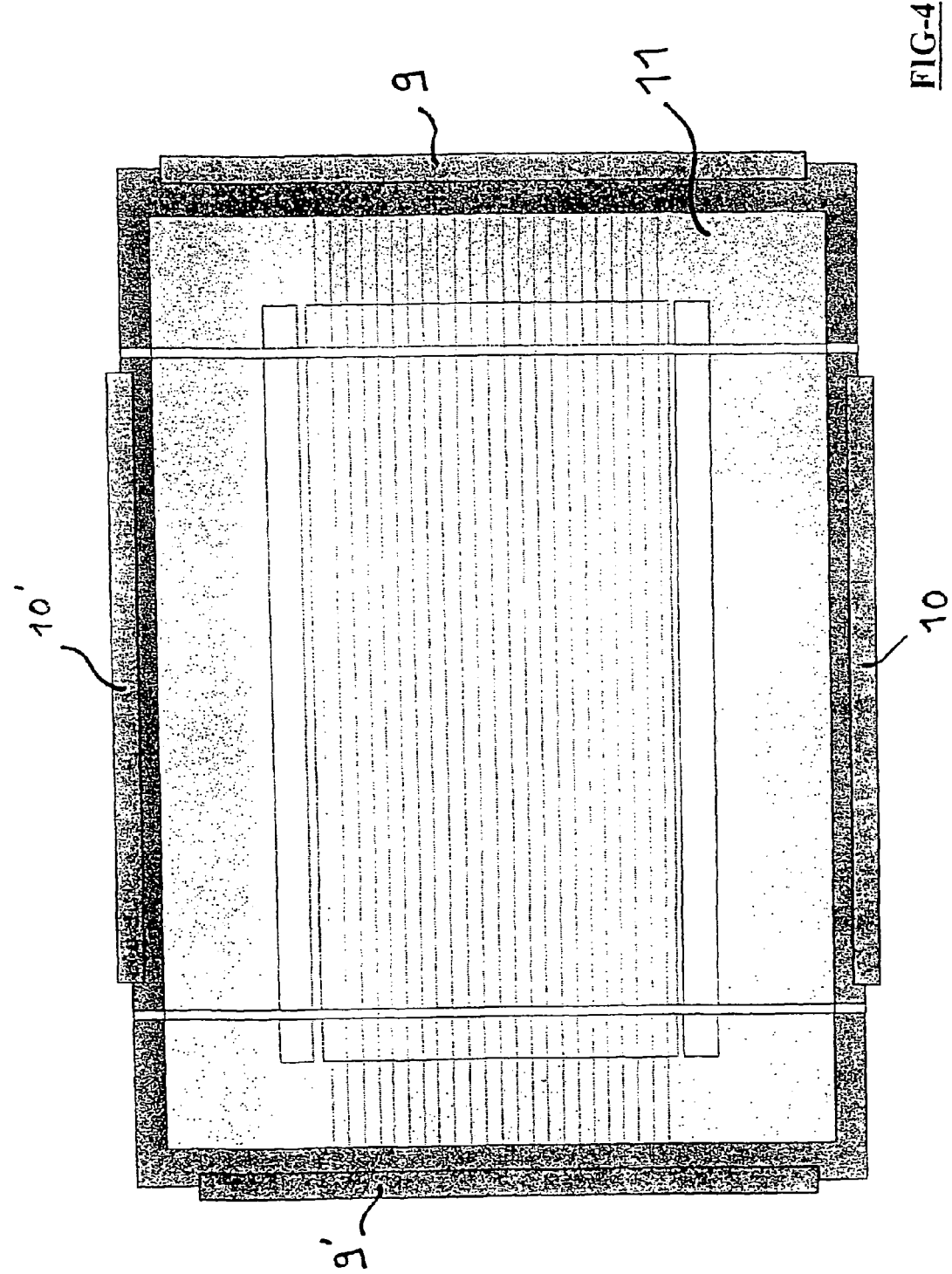

This is the configuration shown in FIG. 4. The margins of the lower conductive layer 2 are set as in Example 1, along two lines crossing from one side to the other of the layer on its two smallest opposed sides. The margin setting of the active stack 3 is also identical to that carried out in Example 1.

This is the type of current lead which changes: in this case, conductive clips 9, 9' are used in order to supply the lower conductive layer 2 and conductive clips 10, 10' in order to supply the upper electrode.

These clips are commercial products which are able to clip onto the glass pane rendered conducting, and available in various sizes.

For the lower conductive layer 2, these clips 9, 9' are fixed so as to cover the edge of the glass pane, so as to be electrically connected to the edges of the layer 2 which are active. They have a length less than the length separating the two incision lines of the layer.

For the upper electrode, FIG. 4 shows the second glass pane 11, which is smaller than the glass pane 1, the clips 10, 10' being clipped, like the clips 9, 9', only on the glass pane 1, thereby establishing electrical contact with the deactivated regions $s_1$, $s_2$ of the layer 2. These deactivated regions, insulated from the rest of the layer, will make electrical contact with the ends of the wires 4, also allowing the upper conductive layer to be powered. In this way, the deactivated regions of the lower electrode are exploited so that the upper electrode can be powered via the conductive wires.

EXAMPLE 5

Figure 5:
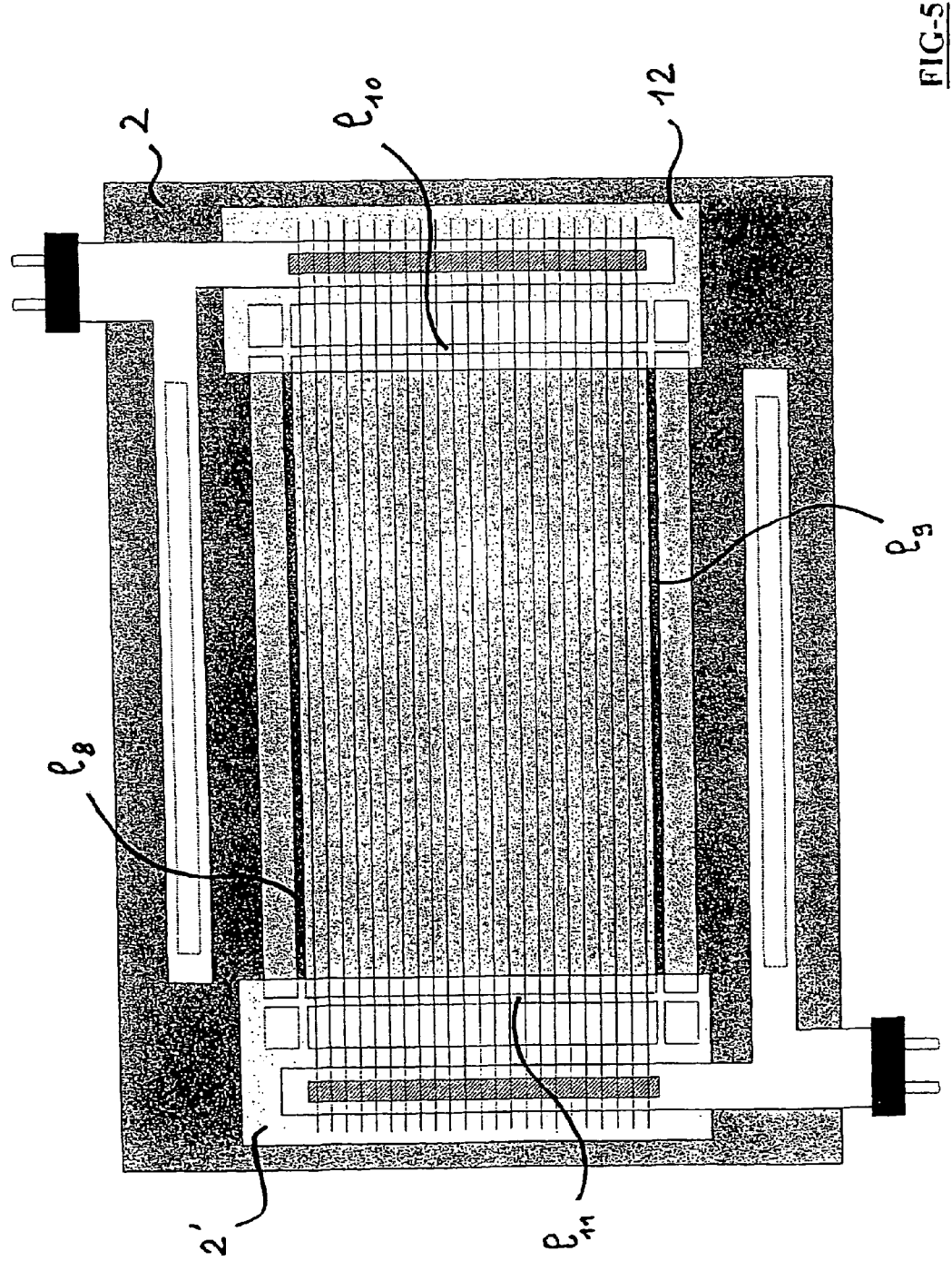

This is the configuration of FIG. 5, which is close to the example 1 shown in FIG. 1, however with three differences:

In this case, the margins of the active stack are set over its entire periphery, with four, rather than two, incision lines $l_8$, $l_9$, $l_{10}$, $l_{11}$ on each of the stack edges. An inactive region $s_5$ is therefore created, which follows the periphery of the active stack 3.

Furthermore, in this case, the margins of the lower conductive layer 2 are not set.

However, in order to avoid short circuits, this configuration uses electrical insulation strips (of the adhesive insulating polymer type on one of its faces). These strips 12, 12' are inserted between all the layers and the current leads, at the two opposed edges of the system, so as to delimit regions identical to the regions $s_6$, $s_7$ of Example 3. These regions in fact overlap the conductive layer 2 not coated with layers and the conductive layer coated with the active stack 3, and "cover" the entire region where the ends of the wires 4 exceed the active stack 3.

In this way, a margin-setting operation is replaced by using additional insulating strips.

EXAMPLE 6

Figure 6:
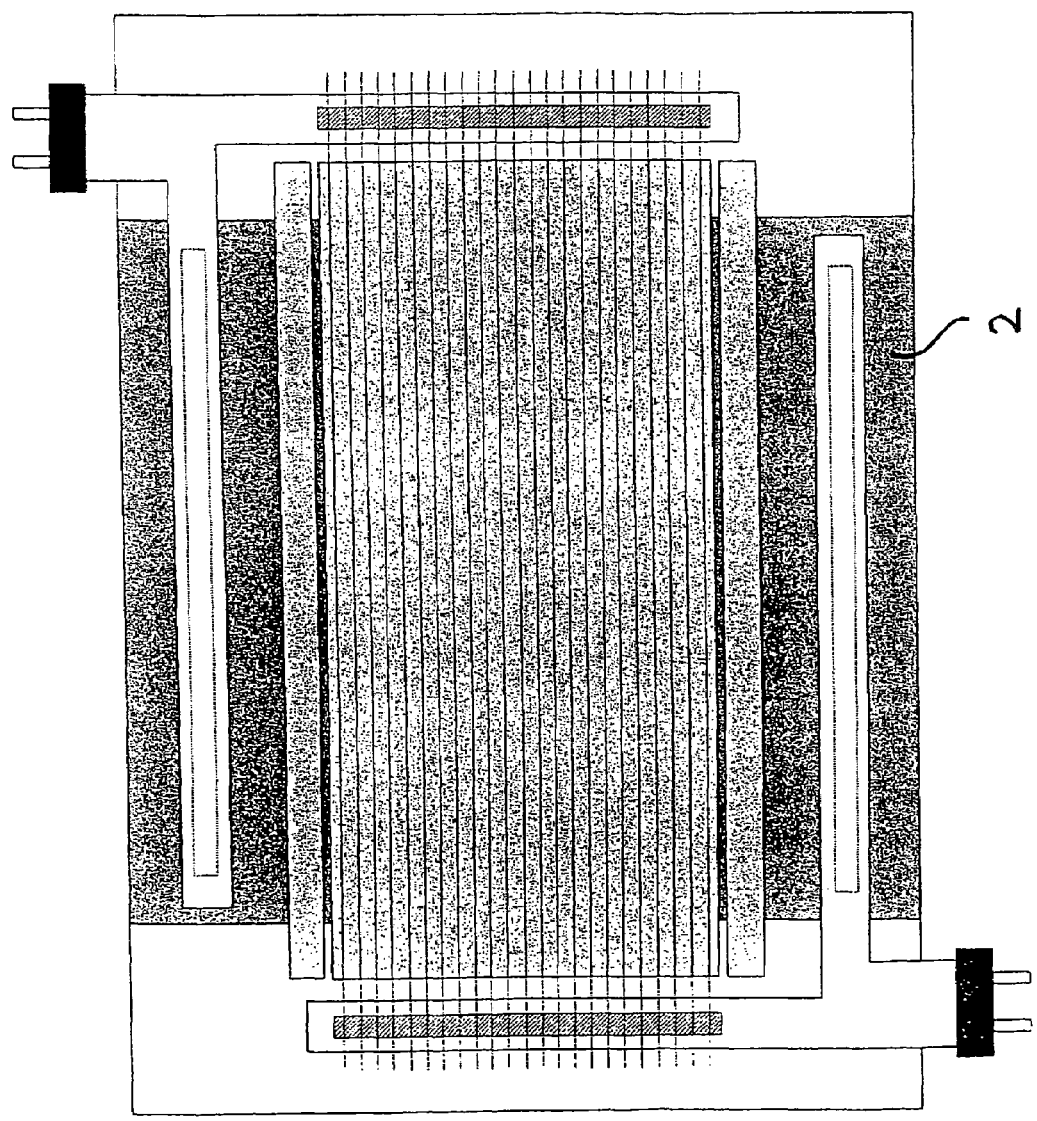

This is the configuration of FIG. 6. It comes very close to Example 1 (FIG. 1).

The only difference relates to the way in which the lower conductive layer 2 is deactivated locally: instead of making incision lines, the layer has been completely removed from the regions corresponding to regions $s_1$ and $s_2$ of FIG. 1. Either it is effectively removed, before depositing the active stack 3, by laser ablation or other etching techniques, or it is deposited directly with the desired dimensions on the glass pane which is already cut with a suitable mask. In both cases, this leads to a layer 2 of rectangular type surmounted by the active system 3 and by the upper electrode, also of rectangular outlines whose longest length is perpendicular to that of the layer 2.

EXAMPLE 7

Figure 7:
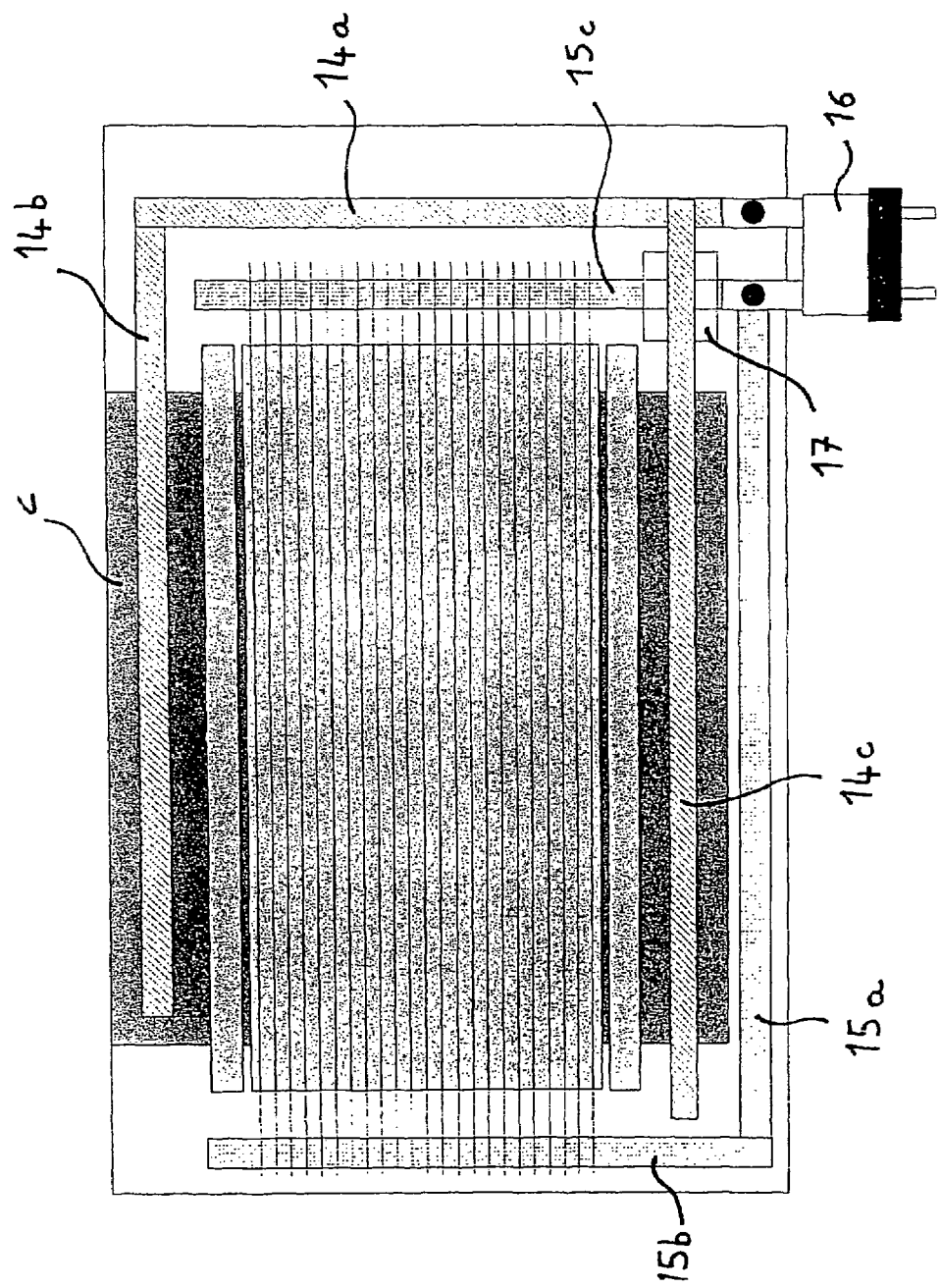

This is the configuration of FIG. 7. It comes very close to that of FIG. 6. It differs therefrom by the type of current lead used: in this case, standard clips in the form of 3 mm-wide silvered copper strips are in fact used:

strips 14a, 14b, 14c to power the lower conductive layer 2, strips 15a, 15b, 15c to power the upper conductive layer via the end of the wires 4 of the conductive network (in fact two superimposed clips sandwich the end of the wires 4).

These strips are electrically connected to a single socket 16. In order to avoid a short circuit between the strips 14a and 15a, for example an electrically insulating polymer film 17 is inserted between the two strips.

EXAMPLE 8

Figure 8:
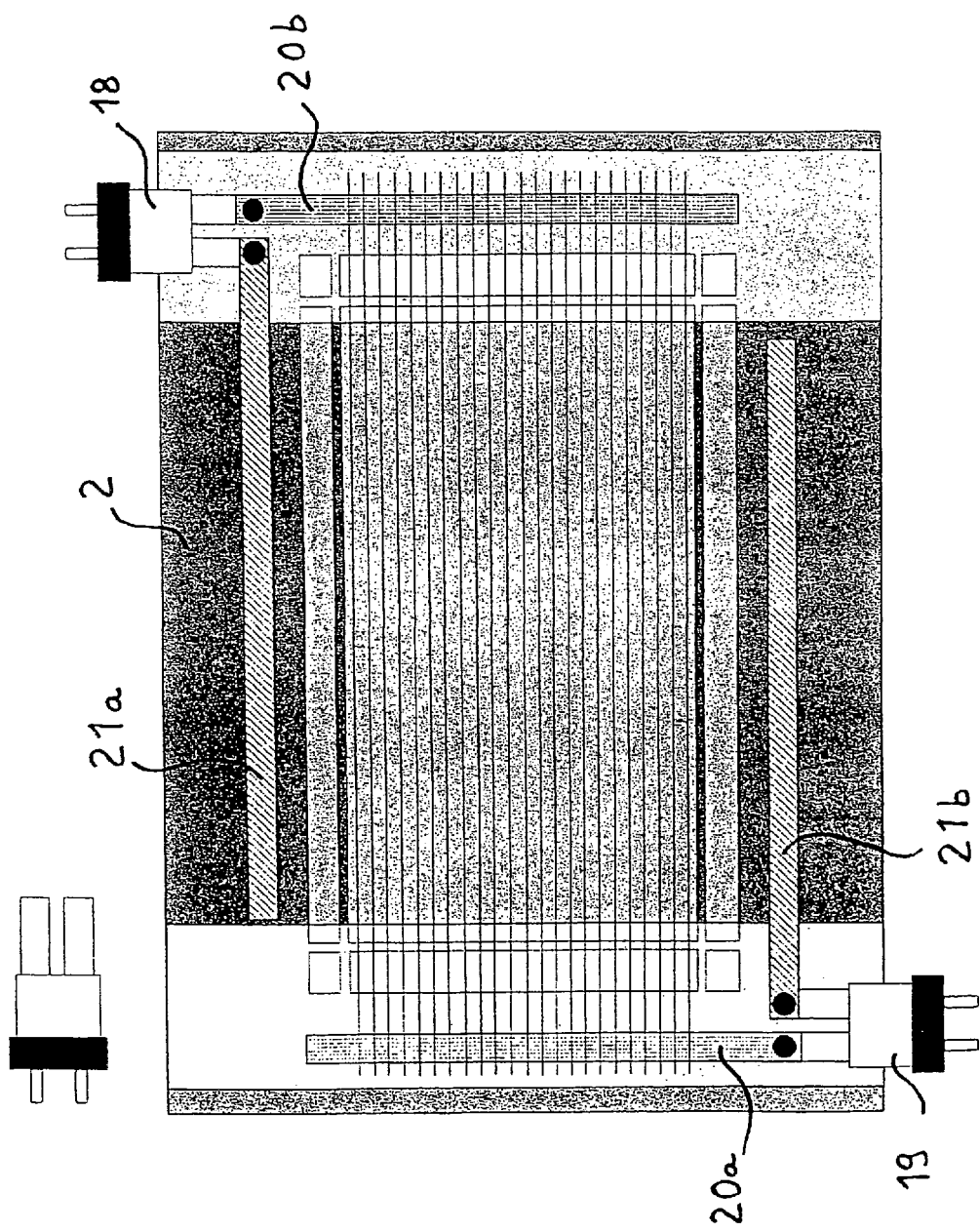

This configuration, shown in FIG. 8, comes very close to that of FIG. 6. It differs therefrom by the type of current lead used: in this case, the same standard silvered copper clips as those in Example 7 are used. In this example 8, there are therefore two sockets 18, 19, each is electrically connected to two superimposed clips 20a, 20b intended to power the upper conductive layer via the end of the wires 4, and to a clip 21a, 21b intended to power the lower conductive layer 2. The clips are connected to the sockets by welding.

EXAMPLE 9

Figure 9:
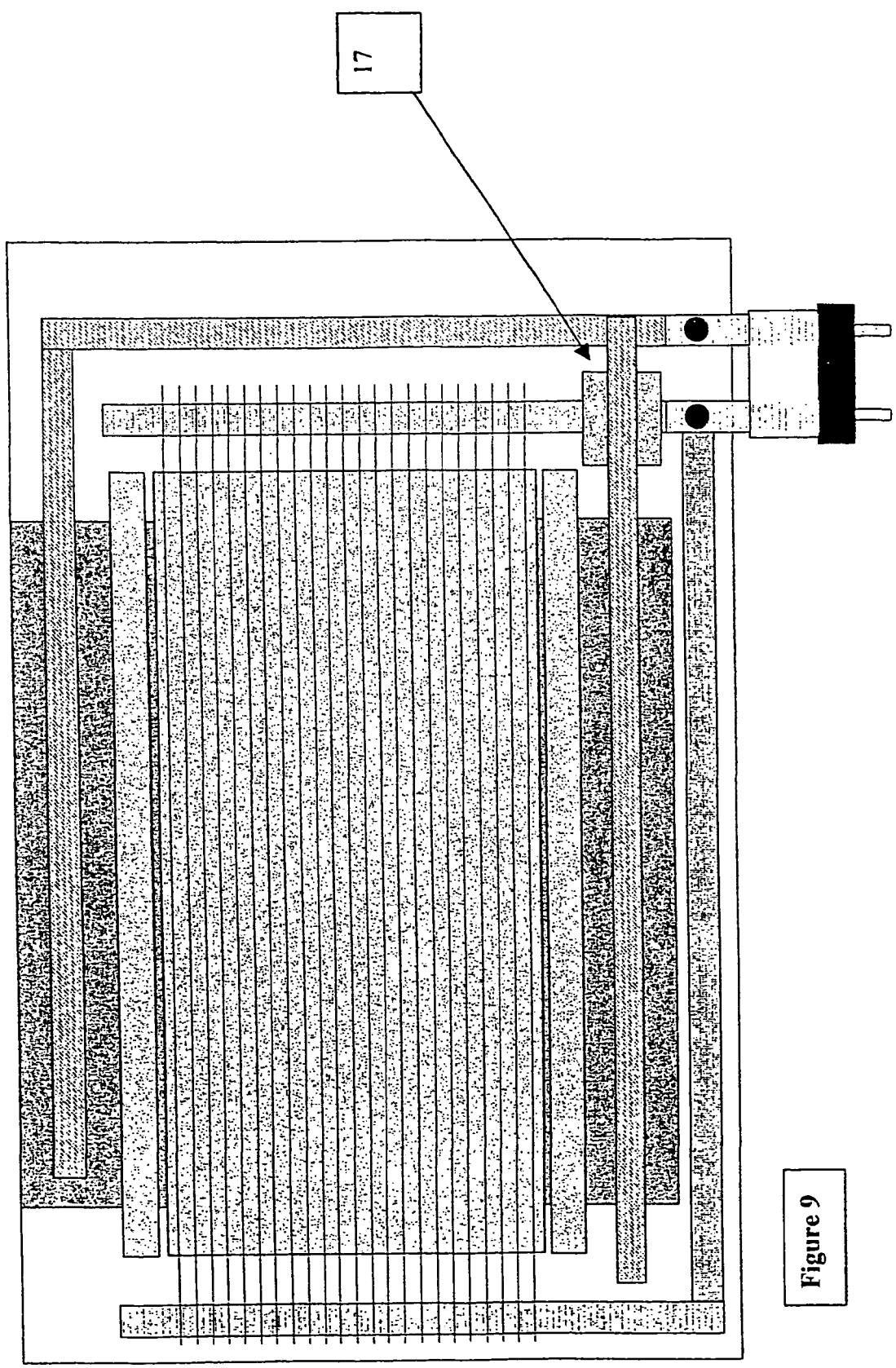

This configuration, shown in FIG. 9, comes very close to that of FIG. 7. However, in the case of Example 9, only part of the carrier substrate is covered by the lower conductive layer. This happens either by removing the lower conductive layer after deposition by a suitable means (acid attack, mechanical attack or laser ablation) or by masking part of the substrate before deposition of the latter. The latter technique is preferred in the case of large dimensions. The benefit of this embodiment is to produce regions which are not electrically conductive and to be able to move the clips around the active region without a risk of short circuits. By means of suitable positioning of the clips and the electrical insulator, the whole glazing is powered by a single electrical output, with cost saving and increased simplicity of mounting.

EXAMPLE 10

Figure 10:
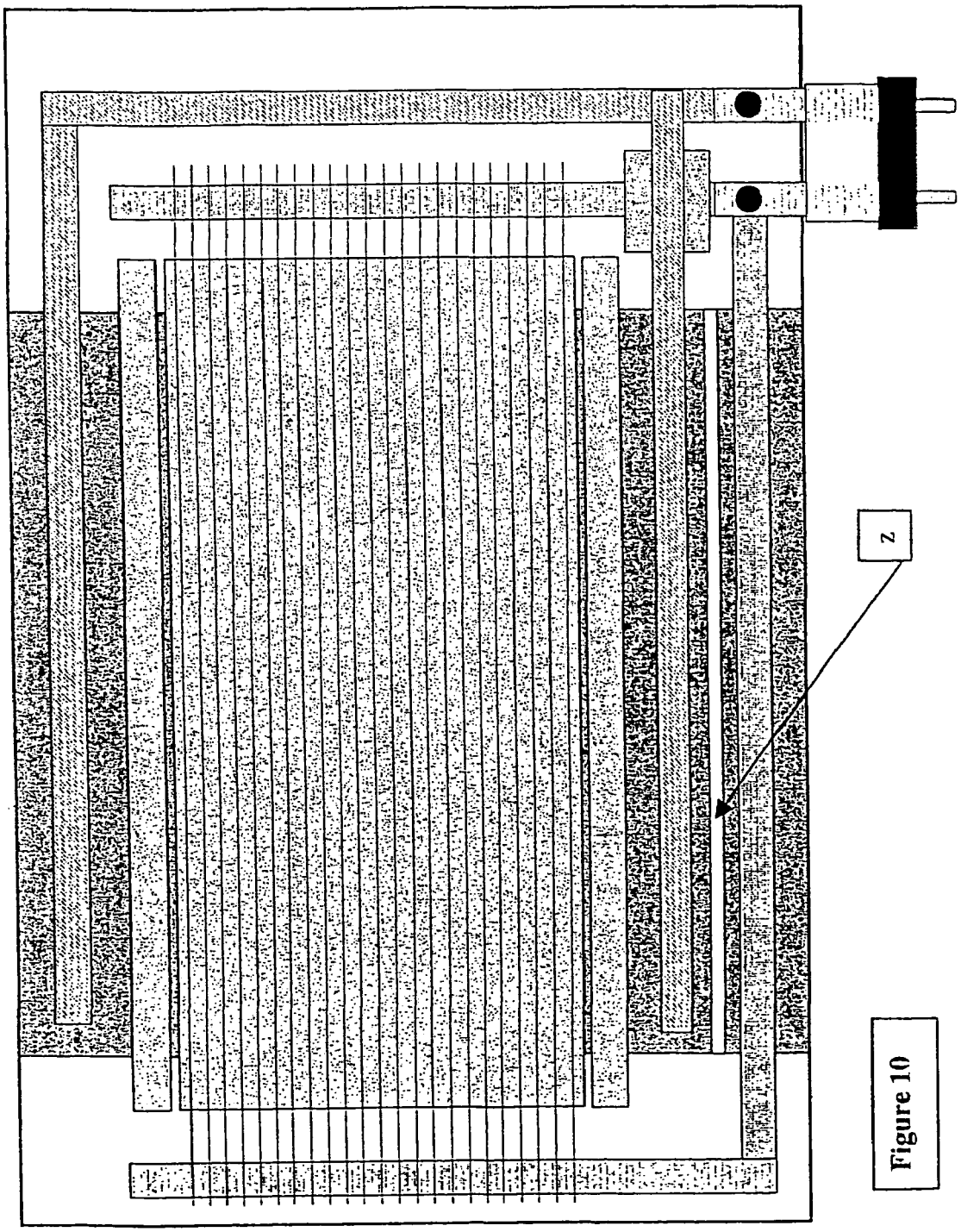

This configuration, shown in FIG. 10, is close to that shown in FIG. 9, but the lower conductive layer is masked on three sides instead of two. Electrical insulation is provided by setting the margins of the lower conductive layer with a laser along a line z. The advantage with respect to FIG. 9 is that the use of a laser is simpler than handling masks.

EXAMPLE 11

Figure 11:
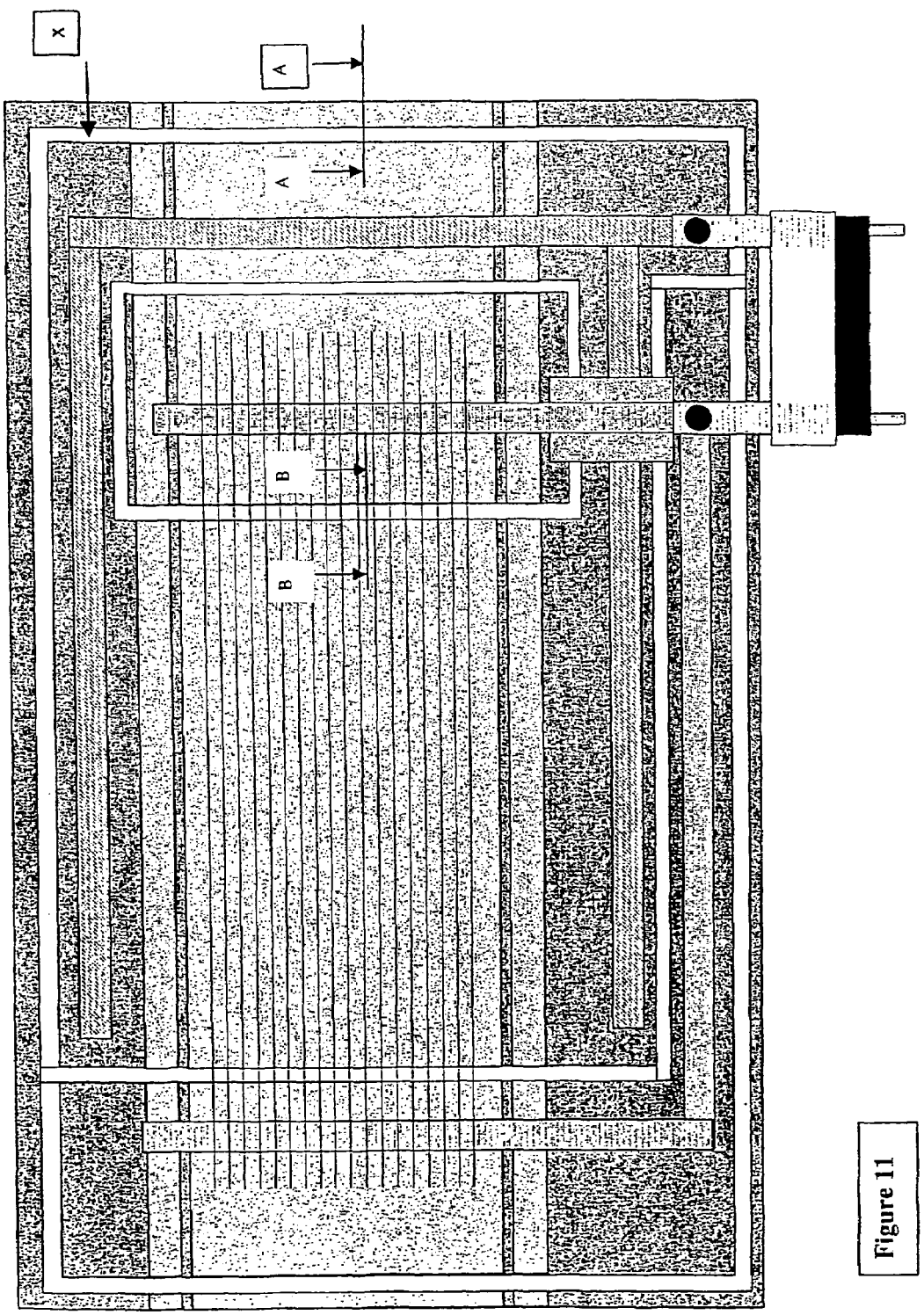

This configuration is shown in FIG. 11. The lower conductive layer is deposited over the entire surface of the carrier substrate. The various margins are set after depositing the active layers. Moreover, a peripheral ablation is carried out over the entire periphery of the glazing in order to avoid the short circuits which could occur by means of the edges.

EXAMPLE 12

Figure 12:
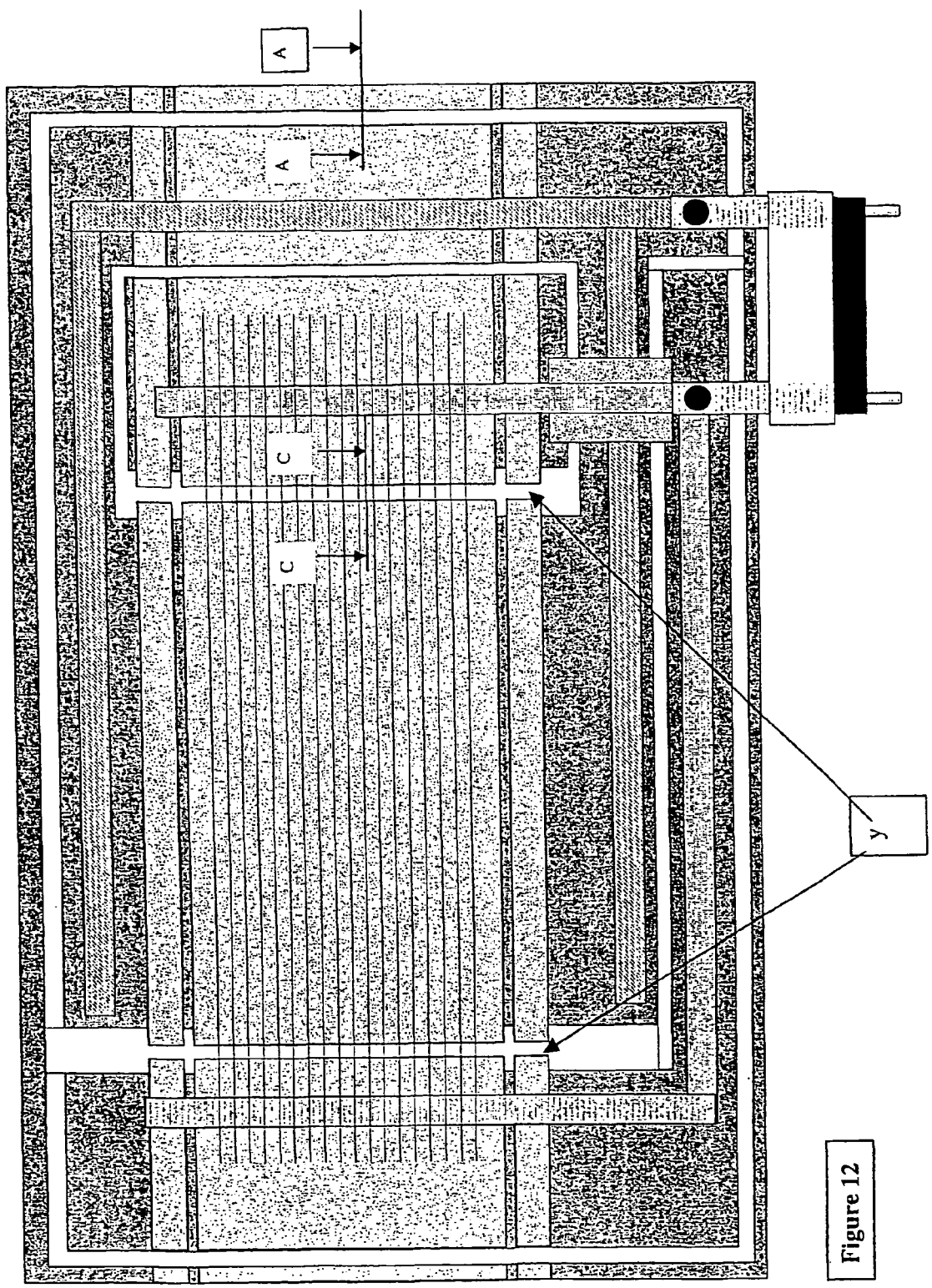

This configuration is shown in FIG. 12. To prevent any short circuit at the wires, a double margin y is made in the region CC. The first is made after depositing the lower conductive layer with a width of 1 mm to 50 mm. The second, which is thinner (100 to 500 µm) is made over the trace of the previous one, after depositing the active layers. The wires are separated from the lower conductive layer by the whole stack and there is no longer a risk of a short circuit.

In conclusion, the invention makes it possible for many variants in the way of powering systems of the electrochromic type (or systems of the viologen, light valve, liquid crystal type and any similar electrochemical system). It is possible to envision using a network of conductive wires or of screen-printed conductive strips for the lower electrode, in the place of or in addition to wires used in the examples for the upper electrode. Various current leads can be used, including standard clips or flexible polymer strips provided with conductive coatings. Current leads which are particularly discreet can also be used, such as simple conductive wires or even point-like current leads.

Depending on the type of mounting, it is possible to arrive at having only two sockets, and even a single socket, which makes it very easy to power the device.

It is possible to make devices of the electrochromic glazing type with very diverse geometries, even though the examples, for reasons of simplicity, describe active stacks with a rectangular surface area.

The invention lies in the fact of separating the visible electric leads to the periphery of the active layers delimiting the actual active region of the glazing, while avoiding short circuits between the two electrodes by means of various types of margin setting. It selectively "deactivates" one or other of the electrodes and/or of the active layers and/or chooses suitable relative positions and dimensions in order to achieve this.

The invention is applicable in the same way to photovoltaic devices, and, more generally, to any electrically controllable or photovoltaic system which comprises at least one "upper" (or "lower") conductive electrode in the sense of the invention: indeed, it is also within the scope of the invention to alter the position with respect to the "active" layers only of the current lead or leads of only one of the electrodes and not of the two electrodes (either by choice, or because the device in question contains only a single electrode of the type described above, that is with one electroconductive layer).

In the case where the lower electrode and the rest of the stack of layers of the active system are incised along the same line, it may be advantageous to provide for the incision line of the lower electrode to be larger than the incision line for the rest of the layers, for electrical considerations: the two incision lines are superimposed and are centered one with respect to the other, in this way, the conductive regions of the lower electrode avoid being left bare (it is the other layers which "go beyond" the incisions with respect to the lower electrode).

The invention claimed is:

1. An electrochemical device, comprising:
   at least one carrier substrate carrying an electroactive stack of layers arranged between a lower electrode and an upper electrode, each electrode comprising at least one electroconductive layer in electrical contact with at least one current lead,
   at least one incision delimiting a deactivated region of the electrochemical device,
   wherein said current leads of at least one of the lower and upper electrodes is arranged outside a region of the carrier substrate that is covered by the electroactive stack of layers.

2. The device as claimed in claim 1, wherein the lower electrode comprises the electroconductive layer to cover at least one region of the carrier substrate not covered by the electroactive stack of layers.

3. The device as claimed in claim 1, wherein the lower electrode comprises the electroconductive layer to cover a first region of the carrier substrate completely covering a second region of the carrier substrate covered by the electroactive stack of layers, and of dimensions greater than the electroactive stack of layers.

4. The device as claimed in claim 1, wherein the lower electrode comprises the electroconductive layer to cover a first essentially rectangular region of the carrier substrate, and wherein the electroactive stack of layers covers a second essentially rectangular region of the carrier substrate, the first and second regions partially covering each other.

5. The device as claimed in claim 3, wherein the electroconductive layer of the lower electrode covers an essentially rectangular region of the carrier substrate that is of larger dimensions and essentially centered on the second region covered by the electroactive stack of layers.

6. The device as claimed in claim 3, wherein the electroconductive layer of the lower electrode covers a rectangular region exceeding, on two of its opposed sides only, the second rectangular region covered by the electroactive stack of layers.

7. The device as claimed in claim 1, wherein the electroconductive layer of the upper electrode covers a region of the carrier substrate that is essentially identical to that covered by the electroactive stack of layers.

8. The device as claimed in claim 1, wherein the electroconductive layer of the lower electrode is deactivated over at least part of its periphery, at least in one of a part over a region not covered by the electroactive stack of layers and a part overlapping a region covered by and a region not covered by the electroactive stack of layers.

9. The device as claimed in claim 7, wherein the electroconductive layer of the lower electrode covers a substantially rectangular region of the carrier substrate, and wherein the electroconductive layer comprises two peripheral deactivated regions along two opposed edges of the region.

10. The device as claimed in claim 8, wherein the electroconductive layer of the lower electrode comprises a deactivated region over its entire periphery.

11. The device as claimed in claim 8, wherein the deactivated region is obtained by the at least one incision of the electroconductive layer along one or more lines, along a line that is closed around its entire periphery, or along two lines crossing the electroconductive layer from one side to the other over two of its opposed edges, or along two lines closed along two of its opposed edges.

12. The device as claimed in claim 11, wherein the incision of the electroconductive layer is carried out after depositing at least one of the electroactive stack of layers and the upper electrode, with simultaneous incision of all the layers when the region of the electroconductive layer to be incised is covered by the electroactive stack of layers.

13. The device as claimed in claim 1, wherein in the deactivated region the electroactive stack of layers has a deactivated region over at least part of its periphery.

14. The device as claimed in claim 13, wherein the electroactive stack of layers covers a substantially rectangular region of the carrier substrate, and wherein the electroactive stack of layers comprises two peripheral regions deactivated along two opposed edges of said rectangular region.

15. The device as claimed in claim 13, wherein the electroactive stack of layers comprises the deactivated region over its entire periphery.

16. The device as claimed in claim 13, wherein the deactivated region of the electroactive stack of layers is obtained by incision of at least one of the whole electroactive stack of layers and the upper electrode, along two lines crossing the electroactive stack of layers from one side to the other on two of its opposed edges, or along a line closed around its entire periphery, or without simultaneously incising the underlying lower electrode.

17. The device as claimed in claim 13, wherein the lower electrode and the electroactive stack of layers are incised at a same location over at least part of a common surface, the two incision lines being superimposed and the incision line of the lower electrode being wider than the incision line of the electroactive stack of layers.

18. The device as claimed in claim 1, wherein at least one of the two electrodes comprises an electroconductive layer combined with a network of conductive wires/conductive strips.

19. The device as claimed in claim 18, wherein the conductive network comprises a plurality of essentially metal wires placed on a surface of a polymer film.

20. The device as claimed in claim 18, wherein the wires/conductive strips are placed essentially parallel to each other, in an orientation essentially parallel to a length or width of the electroconductive layer of the upper electrode, ends of the wires/conductive strips exceeding the region of the substrate covered by the electroconductive layer on two of its opposed edges.

21. The device as claimed in claim 20, wherein ends of the wires/conductive strips that are outside the region covered by the electroconductive layer of the upper electrode are in contact with the electroconductive layer of the lower electrode only in a deactivated region or regions.

22. The device as claimed in claim 20, wherein ends of the wires/conductive strips that are outside the region covered by the electroconductive layer of the upper electrode are electrically insulated from contact with an active region of the electroconductive layer of the lower electrode.

23. The device as claimed in claim 18, wherein ends of the wires/conductive strips associated with the electroconductive layer of the upper electrode are electrically connected to two current leads in a form of flexible strips made of an insulating polymer covered on one or their faces with a conductive coating.

24. The device as claimed in claim 18, wherein ends of the wires/conductive strips associated with the electroconductive layer of the upper electrode are in electrical contact with two deactivated regions of the electroconductive layer of the lower electrode, and wherein the deactivated regions are in electrical contact with current leads, in a form of conductive clips clipping onto the carrier substrate.

25. The device as claimed in claim 1, wherein the electroconductive layer of the lower electrode is electrically connected to current leads, along two of its opposed edges, in active regions that are not covered with the electroactive stack of layers.

26. The device as claimed in claim 24, wherein the current leads are in a form of conductive clips clipping onto the carrier substrate.

27. The device as claimed in claim 23, wherein the current leads of the lower and upper electrodes are brought together in a form of two substantially identical strips, each strip including a small electrically insulating polymer support approximately in an L shape with, on one of sides of the L, a conductive coating on one of the faces, and on another side of the L a conductive coating on the face opposite to the previous face.

28. The device as claimed in claim 27, wherein each L-shaped current lead has an external socket close to a junction between the two sides of the L.

29. The device as claimed in claim 23, wherein all the current leads of the lower and upper electrodes are brought together in a form of an approximately rectangular strip, formed from a flexible support made of an electrically insulating polymer with, on two opposed edges, a conductive coating on one face and on its other edges a conductive coating on a second face opposite to the first face.

30. The device as claimed in claim 1, wherein at least one of the current leads is in a form of a clip, or in a form of one or more conductive wires, or in a form of a point-like lead made of a conductive material.

31. The device as claimed in claim 1, wherein the electroactive stack of layers covers a region of the carrier substrate which is a polygon, a rectangle, a diamond, a trapezium, a square, a circle, a half circle, an oval, or any parallelogram.

32. The device as claimed in claim 30, wherein at least one of the current leads is in a form of a conductive wire or a plurality of conductive wires following all or part of a perimeter delimiting an area of the carrier substrate covered by the electroactive stack of layers.

33. The device as claimed in claim 1, directed to an electrochromic system of all-solid type, a viologen system, a liquid crystal system, a light valve system, or a photovoltaic system.

34. The device as claimed in claim 33, directed to an all-solid electrochromic glazing of a laminated structure.

35. The device as claimed in claim 34, wherein the electrochromic glazing comprises at least one of a bulk tinted glass pane and at least one curved glass pane.

36. The device as claimed in claim 33, further comprising at least one of the following coatings: infrared reflecting coating, hydrophilic coating, hydrophobic coating, photocatalytic coating with antifouling properties, antireflective coating, electro-magnetic shielding coating.

37. The device as claimed in claim 33, wherein the carrier substrate is rigid, semirigid, or flexible.

38. An electrochemical device, comprising:
at least one carrier substrate carrying an electro active stack of layers arranged between a lower electrode and an upper electrode, each electrode comprising at least one electroconductive layer in electrical contact with at least one current lead,
wherein said current leads of at least one of the lower and upper electrodes is arranged outside a region of the carrier substrate that is covered by the electroactive stack of layers, and
wherein the electroconductive layer of the lower electrode is deactivated over at least part of its periphery, at least in one of a part over a region not covered by the electroactive stack of layers and a part overlapping a region covered by and a region not covered by the electroactive stack of layers.

39. The device as claimed in claim 38, wherein the electroconductive layer of the lower electrode comprises a deactivated region over its entire periphery.

40. The device as claimed in claim 38, wherein the deactivated region is obtained by incision of the electroconductive layer along one or more lines, along a line that is closed around its entire periphery, or along two lines crossing the electroconductive layer from one side to the other over two of its opposed edges, or along two lines closed along two of its opposed edges.

41. The device as claimed in claim 40, wherein the incision of the electroconductive layer is carried out after depositing at least one of the electroactive stack of layers and the upper electrode, with simultaneous incision of all the layers when the region of the electroconductive layer to be incised is covered by the electroactive stack of layers.

42. An electrochemical device comprising:
at least one carrier substrate carrying an electroactive stack of layers arranged between a lower electrode and an upper electrode, each electrode comprising at least one electroconductive layer in electrical contact with at least one current lead,
wherein said current leads of at least one of the lower and upper electrodes is arranged outside a region of the carrier substrate that is covered by the electroactive stack of layers,
wherein the electroactive stack of layers has a deactivated region over at least part of its periphery, and
wherein the electroactive stack of layers comprises the deactivated region over its entire periphery.

43. An electrochemical device comprising:
at least one carrier substrate carrying an electroactive stack of layers arranged between a lower electrode and an upper electrode, each electrode comprising at least one electroconductive layer in electrical contact with at least one current lead,
wherein said current leads of at least one of the lower and upper electrodes is arranged outside a region of the carrier substrate that is covered by the electroactive stack of layers,
wherein the electroactive stack of layers has a deactivated region over at least part of its periphery, and
wherein the deactivated region of the electroactive stack of layers is obtained by incision of at least one of the whole electroactive stack of layers and the upper electrode, along two lines crossing the electroactive stack of layers from one side to the other on two of its opposed edges, or along a line closed around its entire periphery, or without simultaneously incising the underlying lower electrode.

44. An electrochemical device, comprising:
at least one carrier substrate carrying an electroactive stack of layers arranged between a lower electrode and an upper electrode, each electrode comprising at least one electroconductive layer in electrical contact with at least one current lead,
wherein said current leads of at least one of the lower and upper electrodes is arranged outside a region of the carrier substrate that is covered by the electroactive stack of layers,
wherein at least one of the two electrodes comprises an electroconductive layer combined with a network of conductive wires/conductive strips,
wherein the wires/conductive strips are placed essentially parallel to each other, in an orientation essentially parallel to a length or width of the electroconductive layer of the upper electrode, ends of the wires/conductive strips exceeding the region of the substrate covered by the electroconductive layer on two of its opposed edges, and
wherein ends of the wires/conductive strips that are outside the region covered by the electroconductive layer of the upper electrode are in contact with the electroconductive layer of the lower electrode only in a deactivated region or regions.

45. An electrochemical device, comprising:
at least one carrier substrate carrying an electroactive stack of layers arranged between a lower electrode and an upper electrode, each electrode comprising at least one electroconductive layer in electrical contact with at least one current lead,
wherein said current leads of at least one of the lower and upper electrodes is arranged outside a region of the carrier substrate that is covered by the electroactive stack of layers,
wherein at least one of the two electrodes comprises an electroconductive layer combined with a network of conductive wires/conductive strips, and
wherein ends of the wires/conductive strips associated with the electroconductive layer of the upper electrode are electrically connected to two current leads in a form of flexible strips made of an insulating polymer covered on one or their faces with a conductive coating.

46. An electrochemical device, comprising:
at least one carrier substrate carrying an electroactive stack of layers arranged between a lower electrode and an upper electrode, each electrode comprising at least one electroconductive layer in electrical contact with at least one current lead, wherein said current leads of at least one of the lower and upper electrodes is arranged outside a region of the carrier substrate that is covered by the electroactive stack of layers, wherein at least one of the two electrodes comprises an electroconductive layer combined with a network of conductive wires/conductive strips, and wherein ends of the wires/conductive strips associated with the electroconductive layer of the upper electrode are in electrical contact with two deactivated regions of the electroconductive layer of the lower electrode, and wherein the deactivated regions are in electrical contact with current leads, in a form of conductive clips clipping onto the carrier substrate.

47. Ann electrochemical device, comprising:

at least one carrier substrate carrying an electroactive stack of layers arranged between a lower electrode and an upper electrode, each electrode comprising at least one electroconductive layer in electrical contact with at least one current lead, wherein said current leads of at least one of the lower and upper electrodes is arranged outside a region of the carrier substrate that is covered by the electroactive stack of layers, and wherein the electroconductive layer of the lower electrode is electrically connected to current leads, along two of its opposed edges, in active regions that are not covered with the electroactive stack of layers.

48. The device as claimed in claim 46, wherein the current leads are in a form of conductive clips clipping onto the carrier substrate.

49. The device as claimed in claim 45, wherein the current leads of the lower and upper electrodes are brought together in a form of two substantially identical strips, each strip including a small electrically insulating polymer support approximately in an L shape with, on one of sides of the L, a conductive coating on one of the faces, and on another side of the L a conductive coating on the face opposite to the previous face.

50. The device as claimed in claim 49, wherein each L-shaped current lead has an external socket close to a junction between the two sides of the L.

51. The device as claimed in claim 45, wherein all the current leads of the lower and upper electrodes are brought together in a form of an approximately rectangular strip, formed from a flexible support made of an electrically insulating polymer with, on two opposed edges, a conductive coating on one face and on its other edges a conductive coating on a second face opposite to the first face.

* * * * *